Aug. 21, 1951     G. R. BEARDSLEY ET AL     2,565,060
TRANSMISSION MECHANISM
Filed June 24, 1947     4 Sheets-Sheet 4
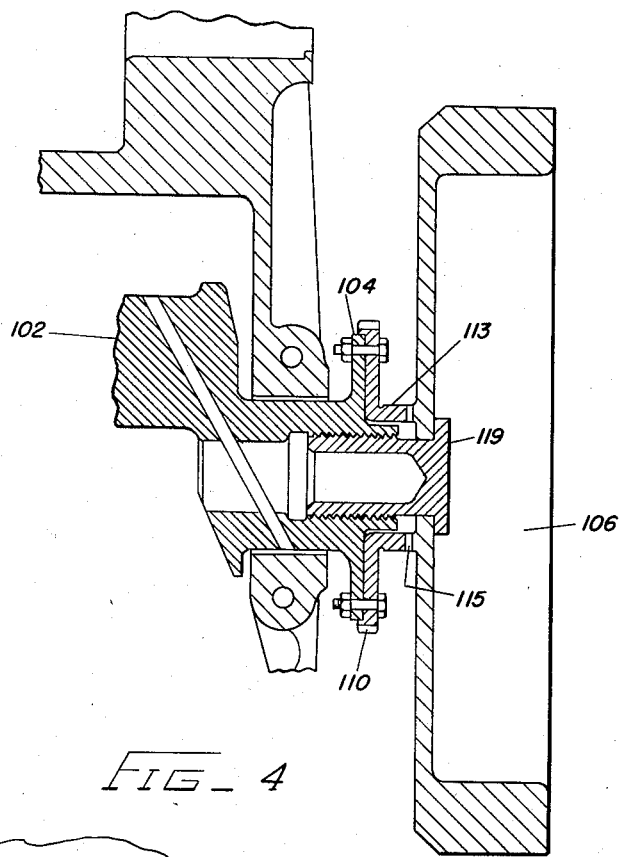
FIG_ 4
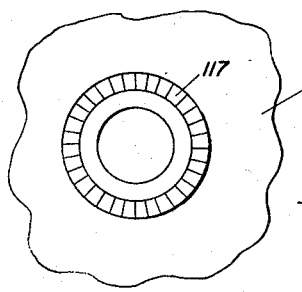
FIG_ 5
INVENTOR.
GALE R. BEARDSLEY
EDWARD A. HULBERT
BY
Hauke, Hardesty & Schmidt
ATTORNEYS.

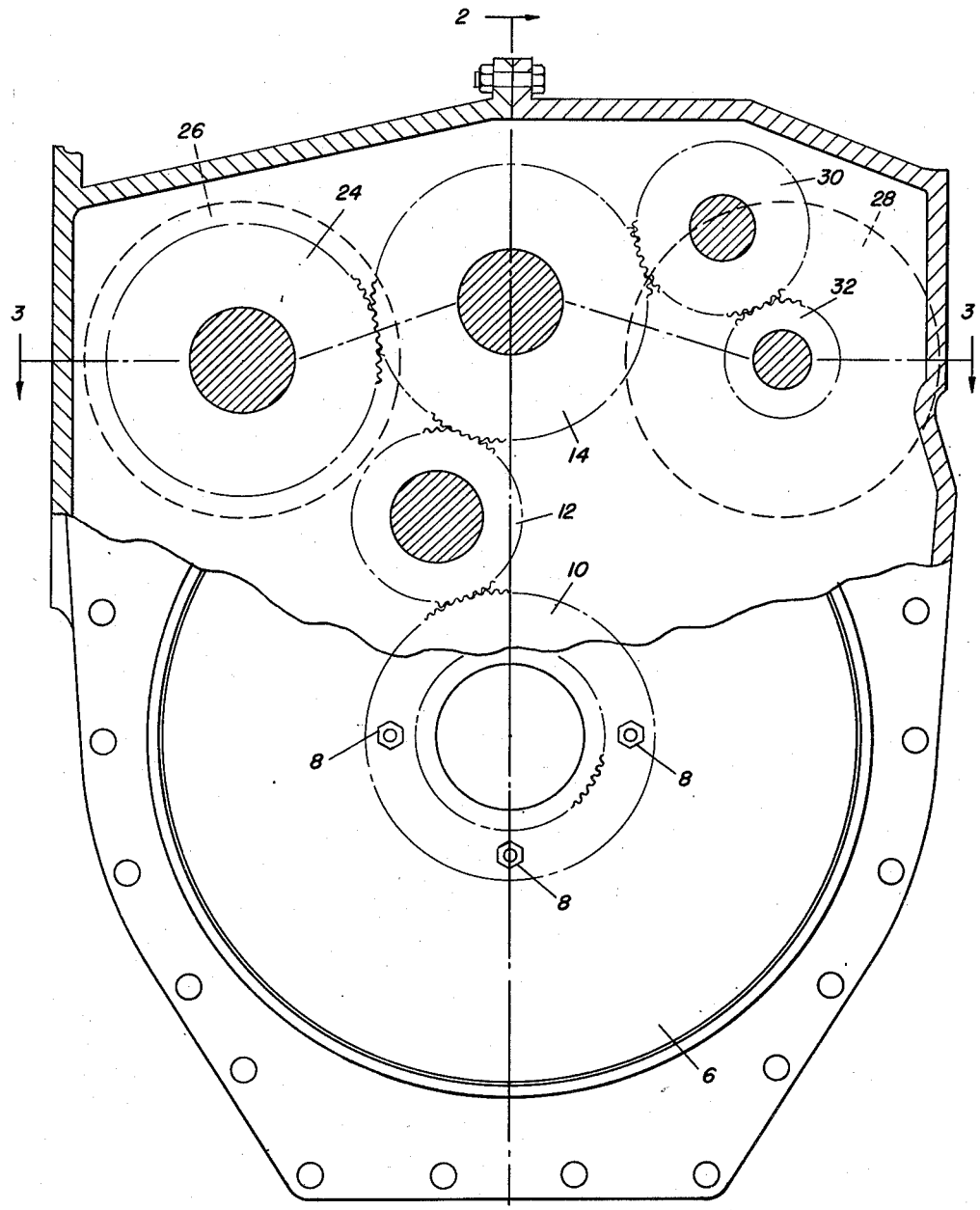

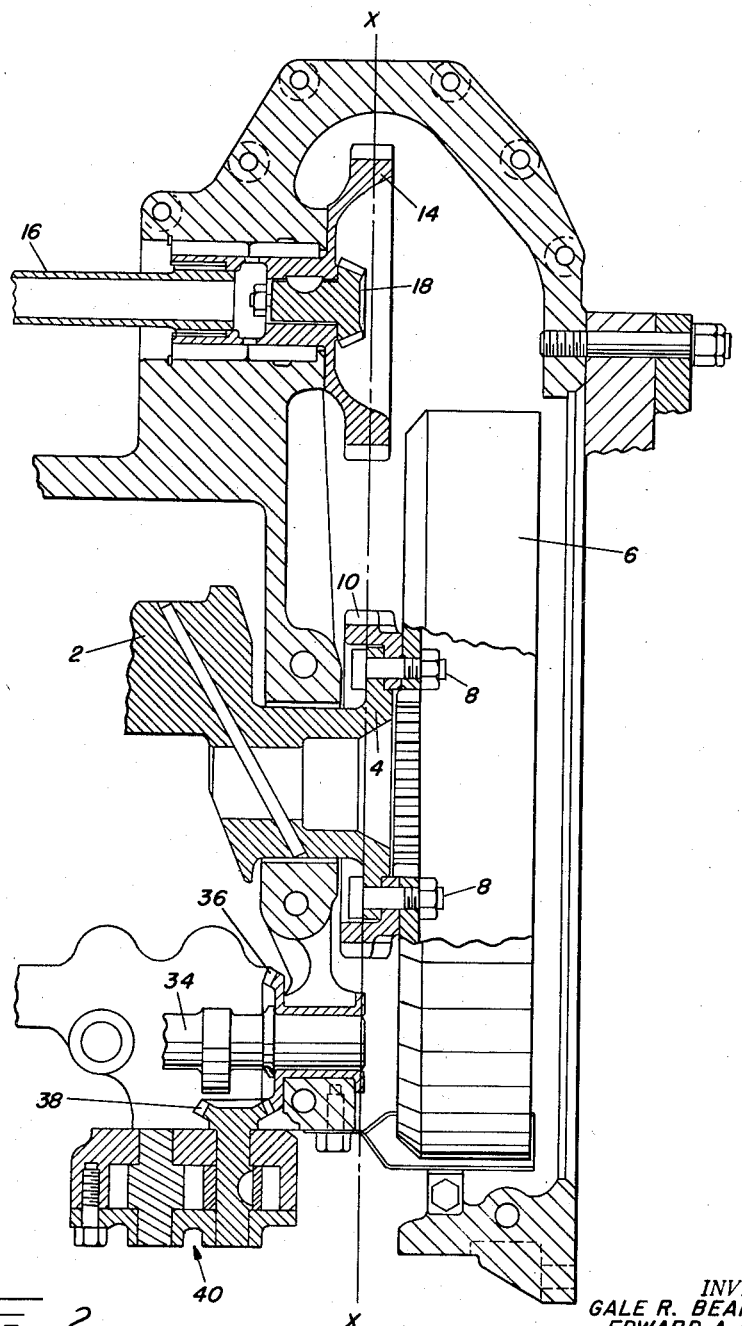
FIG_2

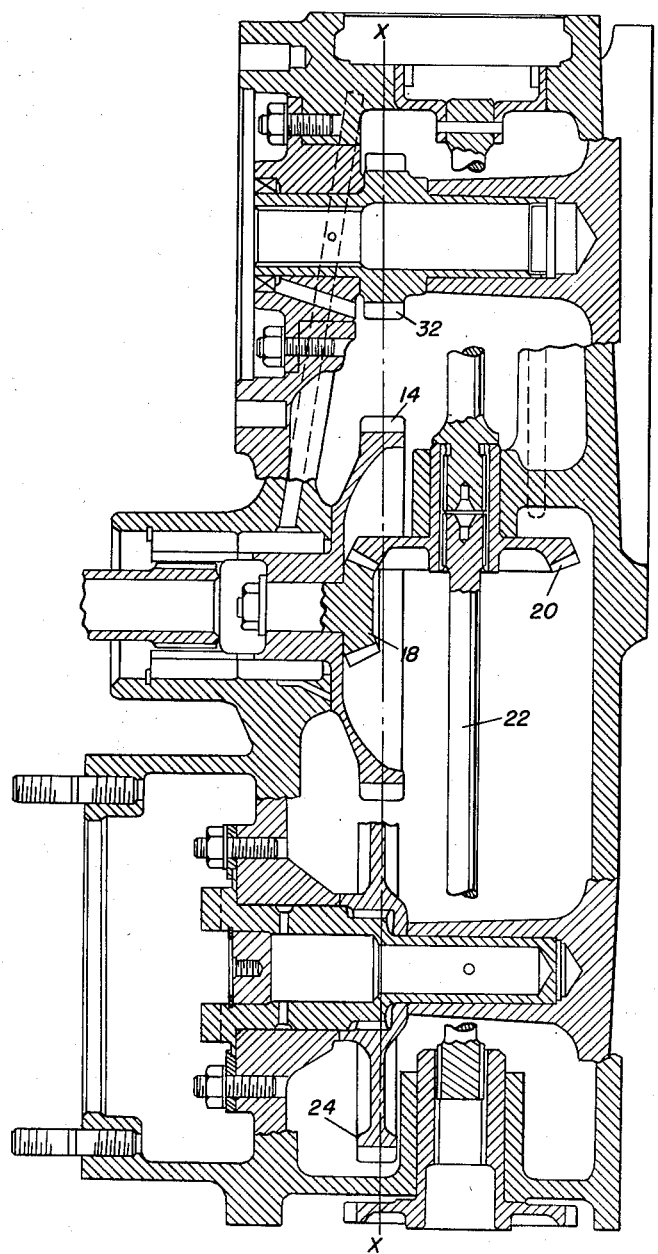
FIG_ 3

Patented Aug. 21, 1951

2,565,060

UNITED STATES PATENT OFFICE 2,565,060

TRANSMISSION MECHANISM

Gale R. Beardsley and Edward A. Hulbert, Detroit, Mich., assignors to Continental Motors Corporation, Detroit, Mich., a corporation of Virginia Application June 24, 1947, Serial No. 756,676

2 Claims. (Cl. 74—665)

This invention relates to internal combustion engines, especially to engines such as are used in automotive vehicles.

In many automotive vehicle applications of internal combustion engines, space is at a premium, and it becomes necessary to design a power plant having certain performance capabilities but within certain size and space limitations. This is most likely to occur in the requirements imposed by military usage, where a space saving results in a weight saving and also in cutting down the physical size of the vehicle. This is often spoken of in terms of a low silhouette. A reduced silhouette makes the vehicle a less favorable target for energy fire.

It will be understood that weight and space economies will also be useful in ordinary commercial vehicles, to the extent that such economies result in increased pay loads.

It is an object of this invention to provide an internal combustion engine for automotive vehicles in which desired performance characteristics may be maintained while economies in weight and space are accomplished.

This and other objects are achieved in an internal combustion engine in which space and weight savings are effected by an unconventional connection between the engine crankshaft and accessory drives.

In this invention, the connection is effected by a gear arrangement in which the gears rotate substantially in a plane which is immediately adjacent one face of the flywheel.

In the drawings:

Fig. 1 is an elevation view of one end of the engine, with parts broken away and in section.

Fig. 2 is a view in section substantially on line 2—2 of Fig. 1.

Fig. 3 is a view in section substantially on line 3—3 of Fig. 1.

Fig. 4 is a view showing a modified method of securing the flywheel, and

Fig. 5 is a view of the central portion of one face of the flywheel shown in Fig. 4.

The invention described herein and shown in the accompanying drawings have been embodied in an engine such as shown in patent application Serial No. 759,985, filed July 10, 1947, and assigned to the assignee of the present invention.

An internal combustion engine made according to this invention is provided with a crankshaft 2. At one end of crankshaft 2 and integral therewith there is provided a flange 4. A flywheel 6 is mounted on and driven by the flange 4 by means of any suitable fastening members such as bolts 8.

A gear 10 is mounted on flange 4 for rotation substantially in the plane of the flange. As can be seen in Fig. 2, gear 10 is disposed between the flange and the flywheel and is thus secured in place by means of the aforesaid bolts 8.

The plane of the flange is designated in each of Figs. 2 and 3 by the line $x$—$x$. An idler gear 12 is mounted for rotation in the plane of the flange and meshes with gear 10. An accessory drive gear 14 is also mounted for rotation substantially in the plane of the flange and meshes with idler gear 12 to be driven thereby. Accessory drive gear 14 is connected to drive a shaft 16 which may transmit power to any suitable accessory such as a cooling fan. Specifically, as applied to the engine and vehicle in the patent application identified above, shaft 16 drives the cooling fan designated by reference numeral 50 in Fig. 1 of the aforesaid copending patent application.

A small gear 18 is mounted inside gear 14 and coaxially therewith. Gear 18 meshes with a second bevel gear 20 which drives an accessory drive shaft 22. Shaft 22 may be connected to drive the magneto, governor, tachometer, and fuel injection drive.

A plurality of gears may be mounted to mesh with accessory drive gear 14 for the purpose of connecting other accessories to the crankshaft gear 10. A gear 24 for example is shown as meshing with gear 14. Gear 24 is connected to the starter motor 26.

A generator 28 is connected to be driven by accessory drive gear 14 by means of an idler gear 30 and a generator drive gear 32.

Gears 10, 12, 14, 24, 30 and 32 are disposed to lie substantially in the plane of flange 4, represented by the line $x$—$x$ in each of Figs. 2 and 3. This plane is immediately adjacent one face of the flywheel 6.

A camshaft 34 is connected to be driven by the crankshaft 2 through conventional drive means disposed at the opposite end from the end shown in Fig. 2. Camshaft 34 carries a bevel gear 36 which meshes with another bevel gear 38. Gear 38 drives the oil pump indicated generally at 40.

In the embodiment shown in Fig. 4, a crankshaft 102 is provided at one end with an integral flange 104 to which is secured a gear 110. Gear 110 carries a centrally located sleeve 113 which is provided with a plurality of radial serrations 115. Serrations 115 on sleeve 113 cooperate with similar radial serrations 117 on one face of flywheel 106. The cooperating serrations 115 and 117 are held in engagement by means of a flanged screw 119 which engages internal threads in the end of crankshaft 102.

Operation

In operation, connection is made between the crankshaft and various accessories through a crankshaft gear immediately adjacent the flywheel. Accessory drive gears rotating in substantially the same plane adjacent the flywheel communicate with the various engine accessories or auxiliaries. The gear arrangement makes for a very compact power take-off for accessories and permits a substantial weight and space saving.

We claim:

1. In an internal combustion engine, a crankcase having a rear engine wall, a crankshaft supported by said crankcase and projecting beyond the rear engine wall, a flange on the end of the crankshaft, a gear secured to the flange and overhanging said crankshaft flange and lying in the plane of the flange, a flywheel secured to said crankshaft flange, a gear train comprising a plurality of gears lying in a plane extending normal to the crankshaft axis and intermediate the flywheel and rear engine wall, and a right angle accessory drive shaft extending transversely of the engine parallel to the plane of the engine wall and in the plane of the flywheel, said drive shaft located above the flywheel, said gear train having a driven spur gear and a beveled gear secured to and nested coaxially with respect to the driven spur gear of said gear train, said flywheel masking a portion of said driven spur gear, and a driven beveled gear carried by the accessory drive shaft and overlying said flywheel lying parallel to but offset slightly to one side of the longitudinal vertical engine through the crankshaft and flywheel axis so that said accessory driveshaft will clear said flywheel.

2. In an internal combustion engine, a crankcase having a rear engine wall, a crankshaft supported by said crankcase and projecting beyond the rear engine wall, a flange on the end of the crankshaft, a gear secured to the flange and overhanging said crankshaft flange and lying in the plane of the flange, a flywheel secured to said crankshaft flange, a gear train comprising a plurality of gears lying in a plane extending normal to the crankshaft axis and intermediate the flywheel and rear engine wall, and a right angle accessory drive shaft extending transversely of the engine parallel to the plane of the engine wall and in the plane of the flywheel, said drive shaft located above the flywheel, said gear train having a driven spur gear and a beveled gear secured to and nested coaxially with respect to the driven spur gear of said gear train, said flywheel masking a portion of said driven spur gear, and a driven beveled gear carried by the accessory drive shaft and overlying said flywheel lying parallel to but offset slightly to one side of the longitudinal vertical engine through the crankshaft and flywheel axis so that said accessory driveshaft will clear said flywheel, and other gears supported by the engine wall and lying in the plane of the gear train aforesaid and said crankshaft flange and supported for operation on axes extending parallel with but offset to either side of the longitudinal vertical engine plane containing said crankshaft and flywheel axis, said flywheel masking a portion of said other gears.

GALE R. BEARDSLEY.
EDWARD A. HULBERT.

REFERENCES CITED

The following references are of record in the file of this patent:

UNITED STATES PATENTS

| Number | Name | Date |
|---|---|---|
| 707,100 | Goss | Aug. 19, 1902 |
| 1,237,331 | Heaslet | Aug. 21, 1917 |
| 1,495,786 | Finley et al. | May 27, 1924 |
| 1,649,518 | Finley et al. | Nov. 15, 1927 |
| 1,720,513 | Dorris | July 9, 1929 |
| 2,284,515 | Criswell | May 26, 1942 |